United States Patent Office 2,980,681
Patented Apr. 18, 1961

2,980,681

SALT OF PIPERAZINE AND 2,4,5-TRICHLOROPHENOL

Franklin W. Short and Edward F. Elslager, St. Clair Shores, Mich., assignors to Parke, Davis & Company, Detroit, Mich., a corporation of Michigan No Drawing. Filed Oct. 14, 1957, Ser. No. 689,744

2 Claims. (Cl. 260—268)

The present invention relates to improved anthelmintic compositions, and more particularly to improved anthelmintic compositions which can be obtained by the formation of a salt of piperazine and 2,4,5-trichlorophenol.

While each of the compounds, piperazine and 2,4,5-trichlorophenol, possesses useful anthelmintic activity, neither exhibits the properties required for its most effective pharmaceutical utilization.

Thus, one of the most desirable methods of administration of anthelmintic agents is by the use of gelatin capsules. Neither piperazine nor 2,4,5-trichlorophenol is satisfactory for this mode of administration. 2,4,5-trichlorophenol produces a discoloration and chemical attack on gelatin capsules within a few weeks' time, and piperazine is a hygroscopic agent which causes significant softening and deterioration of gelatin capsules within a period of time as short as a few days. As helminthiasis is a world-wide problem, of greatest severity in areas of the world which are distant from centers of manufacturing, the problem of providing anthelmintic compositions satisfactory for transportation over great distances and for prolonged storage under adverse conditions is an important one.

The use of gelatin capsules in the treatment of helminthiasis is desirable because they enable the release of the pharmaceutical composition in the intestine, which is a common site of infestation. Previous attempts to solve the problem of chemical attack on the gelatin capsules by phenolic anthelmintic agents other than 2,4,5-trichlorophenol have included coating the interior wall of the capsule, placing the phenolic agent in the capsule in the form of a compressed tablet, or incorporating the phenolic agent in an inert solvent. The former methods cause serious manufacturing difficulties, whereas the latter method requires dilution of the active ingredient with a large amount of an inert carrier, and results in a liquid composition relatively less desirable for use in capsules.

The present invention provides new anthelmintic compositions of exceptional efficacy and pharmaceutical acceptability. This result is achieved by the formation of a salt of the two anthelmintic agents, piperazine and 2,4,5-trichlorophenol, which salt is characterized by its ease of purification, its good crystalline form, its high activity against nematodes of the genera Ascaris, Toxocara, Toxascaris, Ancylostoma, Tichuris, Oxyuris, Nematospiroides and related parasites, its stability upon storage under adverse climatic conditions, and its extraordinary degree of inertness toward gelatin capsules. Thus, no visible capsule deterioration is evident after a period of storage of at least two years.

While certain of these desirable results can be achieved by the formation of salts of piperazine with other phenols, or with other acids, a salt formed with 2,4,5-trichlorophenol affords particular advantages in stability, high activity and lack of toxicity.

Compositions of the present invention can be manufactured by the simple admixture of piperazine and 2,4,5-trichlorophenol. It is preferred, however, to conduct the salt formation in a suitable unreactive solvent, as isolation of the reaction product is facilitated thereby. Representative of such suitable unreactive solvents are neutral, non-hydrolytic solvents. These include hydrocarbons such as benzene, toluene, and xylene; halogenated hydrocarbons such as methylene chloride, chloroform, carbon tetrachloride, ethylene dibromide, tetrachloroethylene and chlorobenzene; ethers such as ethyl ether and dioxane; esters such as ethyl acetate and butyl acetate; and other unreactive solvents.

A preferred embodiment of this invention is the particular salt formed by the interaction of one molecular equivalent of piperazine with two molecular equivalents of 2,4,5-trichlorophenol. When the formation of this salt is conducted in a hydrocarbon or halogenated hydrocarbon solvent by treatment of piperazine with approximately two molecular equivalents of 2,4,5-trichlorophenol, the desired salt is conveniently isolated after rendering it insoluble by vaporization of a portion of the solvent or by dilution of the reaction mixture with petroleum ether.

This invention will appear more fully from the example which follows. As many modifications in materials and methods will be apparent from this disclosure to those skilled in the art, this example is illustrative of only one of the methods of practicing the invention.

*Example*

A warm solution of 19.7 g. of 2,4,5-trichlorophenol in 100 ml. of benzene is added to a warm solution of 4.3 g. of piperazine in 100 ml. of benzene. Petroleum ether is added to the solution until the salt begins to crystallize. After the mixture has been refrigerated for complete separation of product, the white, crystalline salt is collected, washed with ether and dried. This product is piperazine bis(2,4,5-trichlorophenolate), otherwise known as piperazine bis(2,4,5-trichlorophenol) salt, which melts at about 109–110° C. and has the structural formula:

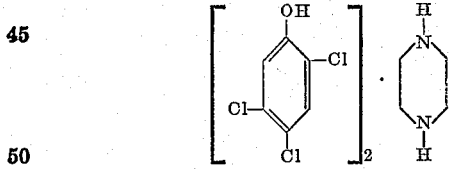

This salt is highly active in intestinal helminthiasis and is stable in gelatin capsules over a period of at least two years on shelf storage. Phamacological doses of 500 milligrams per kilogram per day are well tolerated.

What is claimed is:
1. Piperazine bis(2,4,5-trichlorophenol) salt.
2. A process for the manufacture of piperazine bis-(2,4,5-trichlorophenol) salt which comprises reacting approximately one molecular equivalent of piperazine with approximately two molecular equivalents of 2,4,5-trichlorophenol in an inert solvent, and isolating the product.

References Cited in the file of this patent

Korczynski: Berichte der deutschen chemischen Gesellschaft, vol. 42, pp. 167–177 (1909).

Stevignon: Bull. Chim Soc. (France), vol. 7, pp. 922–926, 1910.

Datta et al.: Jour. Amer. Chem. Soc., vol 45, pp. 2431–33, 1923.